United States Patent
Chomard et al.

(10) Patent No.: US 7,320,770 B2
(45) Date of Patent: Jan. 22, 2008

(54) METHOD FOR MAKING A QUASI-INCOMPRESSIBLE PHASE-CHANGE MATERIAL, SHEAR-THINNED AND WITH LOW HEAT CONDUCTIVITY

(75) Inventors: Angèle Chomard, Paris (FR); Jean-François Argillier, Saint Cloud (FR); Jean-Claude Hipeaux, Colombes (FR)

(73) Assignees: Saipem S.A., Montigny-le-Bretonneux (FR); Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 10/466,930

(22) PCT Filed: Feb. 4, 2002

(86) PCT No.: PCT/FR02/00405

§ 371 (c)(1),
(2), (4) Date: Nov. 5, 2003

(87) PCT Pub. No.: WO02/062918

PCT Pub. Date: Aug. 15, 2002

(65) Prior Publication Data

US 2004/0092626 A1 May 13, 2004

(30) Foreign Application Priority Data

Feb. 7, 2001 (FR) .................................. 01 01892
Feb. 9, 2001 (FR) .................................. 01 01770

(51) Int. Cl.
*B29C 39/10* (2006.01)
*B29C 45/14* (2006.01)

(52) U.S. Cl. ................. 264/262; 264/299; 264/328.18; 252/70

(58) Field of Classification Search ............... 264/262, 264/279, 299; 252/70; 165/104.17, 104.21; 524/62

See application file for complete search history.

(56) References Cited

U.S. PATENT DOCUMENTS 3,665,939 A * 5/1972 Laing ...................... 132/233
4,259,198 A * 3/1981 Kreibich et al. .............. 252/70
4,778,994 A * 10/1988 Conrad et al. .............. 250/586
5,007,478 A * 4/1991 Sengupta ..................... 165/10
5,370,814 A * 12/1994 Salyer ......................... 252/70
5,637,389 A * 6/1997 Colvin et al. ............. 428/308.4
5,709,740 A * 1/1998 Haider et al. ............... 106/272
5,772,949 A * 6/1998 Haider et al. ............... 264/450
6,000,438 A * 12/1999 Ohrn .......................... 138/149
6,132,665 A * 10/2000 Bui et al. ................... 264/308
6,652,705 B1 * 11/2003 Freuler et al. ............. 156/326
6,706,397 B2 * 3/2004 Argillier et al. ....... 428/402.21

FOREIGN PATENT DOCUMENTS

FR    2788100    7/2000

OTHER PUBLICATIONS

Database WPI, Section Ch, Week 198228, Derwent Publications Ltd. GB, AN1982-58205E, XP002180773 & JP 57 090083 A (Ajinomoto KK), Jun. 1982.
Database WPI, Section Ch, Week 199311, Derwent Publications Ltd. GB, AN1993-088888 XP002180774 & JP 05 032964 A (Cosmo Oil Co. Ltd.) Feb. 9, 1993.

* cited by examiner

*Primary Examiner*—Edmund H. Lee
(74) *Attorney, Agent, or Firm*—Antonelli, Terry, Stout & Kraus, LLP.

(57) ABSTRACT

The process according to the invention includes the combination, with a liquid phase change material (PCM), of a texturing agent chosen so as to greatly reduce the thermal convection and whose viscosity is decreased reversibly under shearing. The material formed has a gelled consistency when at rest, and fluidized under shearing. The PCM comprises a mixture of chemical compounds from the alkane family: paraffins, waxes, fatty alcohols, fatty acids etc., and the texturing agent is a high mass polymer (hydrocarbonate polymers, ester or ether polymers, mixed ester-hydrocarbon polymers), an ionomer polymer or a di, tri or multi-block styrene copolymer (SBS: styrene-butadiene-styrene, SEBS: styrene-ethylene-butadiene-styrene).

Applications: thermal insulation of vessels or lines, and more especially, for hydrocarbon transport lines.

23 Claims, No Drawings

METHOD FOR MAKING A QUASI-INCOMPRESSIBLE PHASE-CHANGE MATERIAL, SHEAR-THINNED AND WITH LOW HEAT CONDUCTIVITY

FIELD OF THE INVENTION

The present invention concerns a process for manufacturing a material based on phase change materials (PCM), quasi-incompressible and having low thermal conductivity, and the product obtained by the process and the applications. The material has the characteristic of being able to be fluidized by shearing, then to gel at rest.

The material according to the invention can be used as thermal insulant in many areas, in particular for the thermal insulation of lines or pipes carrying fluids likely to major changes of state under the influence of temperature: crystallisation of paraffins, deposition of hydrates, ice, etc.

This is for example the case in the field of hydrocarbon production. In many cases, it is necessary to provide submarine lines with thermal insulation to keep the fluids flowing, and to prevent for as long as possible, the formation of hydrates or paraffin or asphaltene-rich deposits. Deep sea developments often accumulate these drawbacks which are particularly detrimental in the event of production stoppages.

BACKGROUND OF THE INVENTION

Various heat insulation techniques are described, for instance, in the following documents: FR 98/16.791, JP 2 176 299, or WP 97/47174.

Heat insulation can be accomplished by a variety of processes. On shore, or at shallow depths, cellular or wool-type porous cellular materials are used, to stop the convection of low thermal conductivity gas. The compressibility of these porous materials prohibits the technique from being used at relatively great depths.

Another known technique consists in wrapping the line with a first coat of porous material soaked in paraffin, for instance, whose thermal insulation coefficient is lower than those obtained with the gas trapping technique mentioned above, and a second coat of refractory material strengthening the effect of the first coat. However, this kind of solution cannot be used in water.

There are other solutions that are more suitable for use at great depths. For instance, it is possible to use:
solid quasi-incompressible polymer material coatings based on polyurethane, polyethylene, polypropylene etc. which, however, offer relatively average thermal conductivity, insufficient to avoid drawbacks in the event of production stoppages;
coatings of syntactic materials comprising hollow balls containing a gas and resisting the outside pressure, immersed in binders such as concrete, epoxy resin etc., whose conductivity is lower than that of the compact materials, but that are far more costly.

It is also possible to protect the line in which the fluids circulate by an outer line withstanding the hydrostatic pressure. A heat insulation with low thermal conductivity left at atmospheric pressure or placed under vacuum, with partitions placed at regular intervals for safety reasons, is for example interposed in the annulus between them.

It is also well-known to interpose between the line and a deformable protective sheath an absorbing matrix enclosing the line, impregnated with a liquid/solid phase change quasi-incompressible material having a melting temperature higher than that of the surrounding environment and lower than that of the fluids circulating through the line.

The phase change materials (PCM) behave like heat accumulators. They release this energy in the course of solidification (crystallisation) or absorb this energy during fusion, in a reversible manner. These materials can therefore be used to increase the length of production stoppages without any risks of the lines being clogged by premature cooling of their content.

Known examples of phase change materials are chemical compounds of the alkanes family $C_nH_{2n+2}$, such as for instance, n-paraffins ($C_{12}$ to $C_{60}$), which represent a good compromise between the thermal and thermodynamic properties (fusion temperature, latent fusion heat, thermal conductivity, calorific capacity) and cost. These compounds are thermally stable in the range of operating temperatures considered and are compatible with use in the marine environment because they are insoluble in water and have a very low toxicity level. Therefore, they are well suited to the thermal insulation of deep water lines.

The change of state temperature of these phase change materials is related to the carbon number of the hydrocarbon chain and can therefore be adapted to a particular application. To obtain a phase change at around 30° C., it is possible, for instance, to use a mixture of paraffins essentially comprising $C_{18}$ such as Linpar 18-20 marketed by CONDEA Augusta S.p.A.

The use of waxes, normal paraffins, long-chain weakly branched isoparaffins ($C_{30}$-$C_{40}$) (1 or 2 branches), of long chain branched alkylcycloalkanes or long chain branched alkyl aromatics, also weakly branched, fatty alcohols or fatty acids, may also be considered.

Above their fusion temperature Tf, phase change materials (PCM) are in the liquid phase and their viscosity is low. To overcome this drawback, which is particularly inconvenient for some applications, particularly in the manufacturing of double wall vessels, or energy storage drums, it is well-known to add a thickening agent, such as silica, to solidify them and prevent leaks from occurring.

Another drawback of phase change materials (PCM) is that their liquid state favours thermal losses by convection.

SUMMARY OF THE INVENTION

The process according to the invention allows to manufacture a material or product based on quasi-incompressible phase change material (PCM) having low thermal conductivity at a temperature higher than their fusion temperature Tf and fluidized under shearing.

It includes the combination, with a phase change material, of a texturing agent chosen so as to very considerably reduce the thermal convection at a temperature higher than the fusion temperature of the phase change material.

The texturing agent is brought into solution in the PCM considered in such a way as to give the phase change material a gel-like consistency once the material is at rest. The texturing agent is chosen to obtain fluidification under shearing. In this way, the flow of the material through a tank or a line can take place more easily, in particular by pumping or pouring.

Once in place, the texturing agent gels the material at the point where its primary function of thermal insulant is required.

If necessary, the product may contain anti-oxidant or anti-bacterial agents, corrosion inhibitors or an insoluble filler designed to adjust its density or its thermal conductivity, additives designed to improve its stability or a solvent designed to control its viscosity.

The product according to the invention can be used for thermal insulation. In particular, it can be applied to the thermal insulation of lines transporting hydrocarbons, where it may be used as a direct or interposed coating (injected) between the lines and an outer protective sheath.

Other characteristics and advantages of the process and of the material produced according to the invention, together with several application examples, are described hereafter.

DETAILED DESCRIPTION

The manufacturing process as described here consists in bringing into solution, in a phase change material (hereinafter referred to as PCM), a texturing agent chosen to increase the viscosity of the PCM and decrease the thermal convection of the PCM in the liquid state so as to form an insulating blocked convection substance having a gelled consistency at rest, and is fluidized under shearing.

The liquid component forming the continuous phase can be a mixture of chemical compounds from the family of alkanes $C_nH_{2n+2}$ such as, for instance, paraffins ($C_{12}$ to $C_{60}$) or waxes, normal paraffins, long chain isoparaffins ($C_{30}$-$C_{40}$), very weakly branched (1 or 2 branches), long chain branched alkylcycloalkanes or long chain branched alkylaromatics, fatty alcohols or fatty acids. The liquid component represents between 60% and 99.99% of the product mass, while the complement is the texturing agent.

The texturing Agent is:
a high mass polymer (weight average molecular weight around 25000 to 2 million g/mole): hydrocarbonate polymers, ester or ether polymers or mixed polymers;
a charged polymer and/or ionomer polymers. Ionomer polymers are macromolecules having a molecular mass included between 1000 and 5 million, preferably between 20000 and 1 million g/mole, containing a small percentage of ionic groups (included between 0.005% and 10% by mole, preferably between 0.01% and 5% and even more preferably between 0.2% and 3%) chemically linked and distributed along the non-ionic polymer chains. These polymers are obtained:
either by co-polymerisation between a functionalized monomer and a hydrophobic monomer such as an olefin (for instance: acrylic acid or methacrylic acid with ethylene).
or by the modification of a preformed low polarity polymer (e.g., controlled sulfonation of polystyrene).
a styrene block co polymer, preferably hydrogenated. Block copolymers are thermoplastic elastomers in which polymer chains have a di-block, tri-block, or multi-block configuration. Tri-block copolymers have polystyrene segments (S) at the end of the molecule (preferably close to 30% by mass) and an elastomer segment at the centre. The di-block molecule simply has a polystyrene segment attached to an elastomer segment.

The configuration and the molecular mass vary with the grade of the copolymer (the molecular mass of polystyrene will preferentially be included between 5000 and 30000 g/mol and that of elastomer will be around 5000 g/mol).

The strong interactions between the high-mass polymer and the PCM will allow the penetration of the PCM molecules into the polymer macromolecules. The latter have very large dimensions in solution, they intermingle while slowing down the flow of the PCM layers to which they belong, causing an increase in the composition viscosity.

In the case of charged non-polar polymers, the ionic groups distributed along the chains form, by an association of intermolecular ion pairs, ion-rich aggregates. The aggregates thus formed consequently increase, in the semi-dilute state, the viscosity of the solution compared to the same polymer, not charged, with an equivalent molar mass.

Bringing a block copolymer into solution in the PCM is made by softening of the polystyrene segments under the effect of temperature. The molecules are then free to move when shearing is applied. The polystyrene and the elastomer blocks are not compatible on the thermodynamic level. Accordingly the polystyrene segments at the end of the chain are grouped to form polystyrene domains. The elastomer segments form separate domains. Above a critical co-polymer concentration, the tri-block rubbers form PCM gels with an elastic behaviour (cohesive gels), whereas the di-block rubbers tend to form "greases".

Under shearing, in the case of high mass polymers, the macromolecular coils are laminated with an orientation in the direction of flow and the thickening power is temporarily reduced. In the case of ionic polymers or block copolymers, shearing breaks the reversible bonds (ionic or physical), thus also inducing a temporary reduction in viscosity. This phenomenon may become more marked as the temperature rises.

The consistency of a blocked convection phase change material (PCM-CB) as defined depends on:
the texturing agent concentration,
the type of polymer (plastic, elastomer, etc) or copolymer skeleton, molecular mass, flexibility, number of blocks etc.
the solvent capacity of the PCM in relation to the texturing agent (nature of the chains),
the dispersion forces, and in addition in the case of charged polymers:
the faculty of the solvent (PCM) to ionise the ion pairs. The less polar the solvent, the higher the interactions.
the proportion of charged groups, the nature of the ionic group (e.g. for anionic: carboxylate, sulfonate, phenate, salicylate, phosphonate), type of counter-ions (e.g. for anionic: cations: amine, metal, monovalent, multivalent, . . . ).

A suitable combination of these parameters will make it possible to optimise the insulating power of the PCM-CB at temperatures higher than the fusion temperature Tf of the PCM.

EXAMPLES OF COMPOSITIONS

Blocked Convection PCMs can be Formed by Bringing into Solution:
1a) hydrocarbon polymers (apolar) such as polyisobutylenes or polyisobutenes (PIB); ethylene, propylene or higher carbon polymers; ethylene, propylene or higher carbon copolymers and their derivatives; copolymers based on combined dienes (hydrogenated polybutadiene, hydrogenated butadiene-styrene, hydrogenated ethylene-butadiene and hydrogenated isoprene-styrene copolymers) linear, tri-block (e.g. styrene-ethylene-butadiene-styrene, grade G1651 from Kraton) or radial; or other styrene based polymers,
1b) ester polymers (polar) such as alkyl polyacrylates; alkyl polymethacrylates; maleates and fumarates; itaconates;
1c) mixed ester-hydrocarbon polymers such as olefin copolymers associated with esters (OCP-esters); alkyl-styrene methacrylate or acrylate polymers; alkyl-α-olefin or polyolefin acrylate or methacrylate copolymers.

These polymers can be used alone or as a mixture (mixture of polyisobutene and hydrogenated diene-styrene, of olefin polymers or copolymers, of hydrogenated dienes-styrene with ester polymers or copolymers, etc) and can be functionalised by polar units such as imides, succimides, vinylpyrolidone, etc.

Blocked convection PCMs can also be formed by bringing into solution ionomer polymers such as (generally, the ionic polymer is neutralised by a metallic or organometallic counter-ion):

2a) anionic, cationic or amphoteric ionomers.
2b) a combination of various ionomers.
2c) telechelic polymers, i.e. the ionic groups are the chain ends (in this case, there are only two ionic groups per chain and the molecular mass is generally relatively low).

The ionic groups can be anionic (carboxylate, sulfonate, phosphonate, thioglyconate group), cationic (ammonium or pyridium salts, alkaline (Na, K) or alkaline-earth salts (Mg, Ca, Ba), amphoteric or zwitterionic (e.g. carboxylbetaine).

The main known industrial ionomers are those comprising carboxylate or sulfonate groups.

The Following List is not Limitative:
Carboxylated ionomers:
Ethylene and methacrylic acid copolymer;
Carboxylated elastomers: polymers consisting of monomers containing a carbolyxic acid (generally acrylic or methacrylic acid) and monomers used for forming elastomers. These are for instance polymers of styrene-butadiene-acrylic acid, butadiene-acrylonitrile-acrylic acid, butadiene-acrylic acid polymers, . . . ;
Perfluorocarboxylated ionomers;
Sulfonated ionomers:
Sulfonated ethylene-propylene-diene terpolymers (sulfonated EPDMs).
One preferred diene is 5-ethylidene-2-norbornene (ENB);
Sulfonated elastomers: polymers comprising sulfonated monomers (generally sulfonated styrene) and monomers used for forming elastomers. The sulfonated elastomers are derived from elastomer polymers chosen from the group formed of isoprene and sulfonated styrene copolymers, chloroprene and sulfonated styrene copolymers, isoprene and butadiene copolymers, styrene and sulfonated styrene copolymers, butadiene and sulfonated styrene copolymers, isoprene, styrene and sulfonated styrene terpolymers, butadiene, styrene and sulfonated styrene terpolymers, butyl rubber, partially hydrogenated polyisoprene, partially hydrogenated polybutylene, partially hydrogenated naturel rubber, partially hydrogenated polybutadiene, neoprene. The methods and characteristics of these sulfonated elastomers are known to the man skilled in the art (for instance, in documents U.S. Pat. No. 4,447,338, U.S. Pat. No. 4,425,462);
chlorosulfonated polyethylene;
perfluorosulfonated ionomers;
Telechelic ionomers: like carboxylated telechelic elastomers (e.g. butadiene and acrylonitrile copolymer functionalised at the two ends of the chain) or sulfonated telechelic elastomers based on polyisobutylene.

The ionomer polymer can be added to the PCM at concentrations varying from 0.01 to 10%, and preferably 0.1 to 3% by mass with respect to the total mass.

Additives

To bring in certain specific properties, the following compounds can advantageously be included in the compositions for some applications.

1-Soluble Additives
a) Antioxidant additives may be added either during implementation, if the temperature is high (e.g.: Irganox 1010 from Ciba), or when the product (PCM with blocked convection) is exposed to a temperature rise in service. In this case, the most frequently encountered compounds are phenol derivatives (dibutylparacresol, etc.), phenol derivatives containing sulphur and aromatic amines (phenyl α or β naphthylamine or alkyl amine diphenyls). These antioxidants slow down the oxidation process because they inhibit the forming of free radicals or have a destructive effect on the formed hydroperoxides.
b) antibacterial agents.
c) corrosion inhibitors:
c1) soluble in the liquid PCM, comprise polar chemical compounds which are adsorbed easily on the metallic surface while forming a hydrophobic film (fatty amines or amides and derived substances, alkaline-earth sulfonates, etc.);
c2) soluble in water and acting by passivation of the water phase (e.g., sodium nitrite).

2-Fillers

Insoluble fillers such as hollow glass microballs, fly ash, macroballs, hollow fibres, clayey compounds, etc, can be added advantageously to the PCM-CB to adjust its density and/or its thermal conductivity.

3-Solvents

To fluidify the blocked convection PCM, it is possible to use hydrocarbons of petroleum origin, such as hydrocarbon-containing solvents: distillation cuts, predominantly aromatic, naphthenic or paraffinic oils obtained using solvent extraction processes or deep hydro-treatment processes, solvents or cuts obtained by hydroisomerisation of paraffin extracts of petroleum origin, or by Fischer Tropsch synthesis, solvents and compounds obtained by synthesis, for instance, oxygenated compounds of the ester type, synthetic hydrocarbons such as hydrogenated polyolefins, etc. A PCM co-solvent can also be used to check and adjust the influence of temperature on the viscosity.

The blocked convection PCM (PCM-CB) material typically comprises between 60 and 99.99% liquid PCM and complementary texturing agent. Additives (<10%), fillers (5 to 60%), and solvents (0.2 to 20%) are possibly added.

FORMULATION EXAMPLES

1) In the case of an apolar PCM like a mixture of paraffins with viscosity of around 5 mPa·s at 40° C., a blocked convection formulation based on this PCM, containing approximately 15% of a product based on hydrogenated butadiene-styrene (PBSH) and 0.5% of antioxidant agent, has a viscosity of 100000 mPa·s at 40° C. This viscosity is reduced by 50% (50000 mPa·s) with shearing of $5 \; 10^5 \; s^{-1}$ and by 70% (40000 mPa·s) with the same shearing at 80° C.

2) Gelation of 1 litre of liquid PCM is obtained by the dissolution of several ten grams/litre of a sulfonated ionomer neutralised by a zinc salt and having a sulfonate proportion of around 30 millequivalent/100 g.

Applications

The blocked convection PCM materials described can be used, for instance, for the thermal insulation of submarine lines.

In patent application FR 98/16.791 already mentioned, a thermal insulation and device for submarine lines is described, intended to be laid on the seabed at a great depth. The device includes an outer coating consisting of a liquid/solid phase change material (PCM) quasi-incompressible having an intermediate fusion temperature between the temperature of the effluents circulating in the line(s) and the temperature of the outside medium, and an absorbing matrix surrounding the lines as closely as possible. The lines and their coating are placed in a resistant and deformable protective sheath.

The outer coating consisting of the matrix impregnated with PCM described in the prior document can be advantageously replaced by one of the blocked convection PCMs described above, having the result of an improvement in the thermal insulation of the lines and the simplification of the installation operations around the line(s), for instance, by pumping at a temperature higher than the fusion temperature Tf, particularly appreciable when the line assembly to be insulated is complex. Pumping is facilitated because, during shearing, the viscosity of the material decreases.

Applications of the material to thermal insulation of lines used for transporting fluids, especially hydrocarbons, have been described. It is obvious, however, that such a material can be used in any other application requiring low thermal conductivity, combined with energy release.

The invention claimed is:

1. Process for manufacturing a material for thermal insulation based on phase change material (PCM), having low thermal conductivity, characterised in that it comprises combining a phase change material with a texturing agent chosen to greatly reduce the thermal convection at a temperature higher than the fusion temperature of the phase change material and whose gelling or viscosifying capacity drops temporarily under shearing so as to give the phase change material a consistency of a gel when at rest and obtain fluidification under shearing.

2. Process as claimed in claim 1, characterised in that it includes the combination of a texturing agent in a solution in the phase change material.

3. Material for thermal insulation based on phase change materials (PCM) exhibiting low thermal conductivity at a temperature higher than the fusion temperature of the phase change material, characterised in that it includes in combination a phase change material (PCM) and a texturing agent chosen to greatly reduce the thermal convection at a temperature higher than the fusion temperature of the phase change material, and whose gelling or viscosifying capacity drops temporarily under shearing so as to give the phase change material a consistency of a gel when at rest and obtain fluidification under shearing.

4. Material for thermal insulation based on phase change materials (PCM) exhibiting low thermal conductivity at a temperature higher than the fusion temperature of the phase change material, characterised in that it includes in combination a phase change material (PCM) and a texturing agent chosen to greatly reduce the thermal convection at a temperature higher than the fusion temperature of the phase change material, and whose gelling or viscosifying capacity drops temporarily under shearing so as to give the phase change material a consistency of a gel when at rest and obtain fluidification under shearing, wherein the texturing agent is at least one, or mixtures thereof, of the polymers chosen from the group consisting of: non-dispersing or dispersing hydrocarbon polymers (apolar), non-dispersing or dispersing ester polymers (polar), or mixed non-dispersing or dispersing ester-hydrocarbon polymers.

5. Material for thermal insulation based on phase change materials (PCM) exhibiting low thermal conductivity at a temperature higher than the fusion temperature of the phase change material, characterised in that it includes in combination a phase change material (PCM) and a texturing agent chosen to greatly reduce the thermal convection at a temperature higher than the fusion temperature of the phase change material, and whose gelling or viscosifying capacity drops temporarily under shearing so as to give the phase change material a consistency of a gel when at rest and obtain fluidification under shearing, wherein the texturing agent is an onomer texturing polymer defined as consisting of macro molecules with a small percentage of chemically-linked ionic groups distributed along non-ionic chains (skeletons).

6. Material as claimed in claim 5, characterised in that the texturing polymer referred to as the ionomer contains anionic groups selected from the group consisting of carboxylate, sulfonate, phenate, salicylate, phosphonate, thioglyconate, and/or cationic groups selected from the group consisting of ammonium, pyridium salts or organometallic, alkaline or alkaline-earth salts and/or amphoteric and/or zwitterionic groups selected from the group consisting of carboxylbetaines.

7. Material as claimed in claim 1, characterised in that it includes 60 to 99.99% of liquid PCM, the complement consisting of a texturing agent by mass.

8. Material as claimed in claim 3, characterised in that it includes in addition at least one soluble additive acting as an anti-oxidant or anti-bacterial agent or a corrosion inhibitor.

9. Material as claimed in claim 3, characterised in that it includes in addition at least one insoluble filler designed to adjust its density or is thermal conductivity.

10. Material as claimed in claim 3, characterised in that it includes in addition at least one solvent designed to control the viscosity.

11. A method for thermal insulation of a fluid carrying line, comprising coating the line with a material for thermal insulation based on phase change materials (PCM) exhibiting low thermal conductivity at a temperature higher than the fusion temperature of the phase change material, characterised in that the material includes in combination a phase change material (PCM) and a texturing agent chosen to greatly reduce the thermal convection at a temperature higher than the fusion temperature of the phase change material, and whose gelling or viscosifying capacity drops temporarily under shearing so as to give the phase change material a consistency of a gel when at rest and obtain fluidification under shearing.

12. A method for thermal insulation of a fluid carrying line, comprising interposing a material for thermal insulation between the line and an outer protective sheath, the material for thermal insulation being based on phase change materials (PCM) exhibiting low thermal conductivity at a temperature higher than the fusion temperature of the phase change material, characterised in that the material includes in combination a phase change material (PCM) and a texturing agent chosen to greatly reduce the thermal convection at a temperature higher than the fusion temperature of the phase change material, and whose gelling or viscosifying capacity drops temporarily under shearing for textural insulation being based so as to give the phase change material a consistency of a gel when at rest and obtain fluidification under shearing.

13. A method as claimed in claim 12, wherein the material is injected into the annulus between the line and an outer protective sheath while the material is fluidified.

14. A method as claimed in claim 13, wherein the line is a hydrocarbon fluid carrying line.

15. A method as claimed in claim 12, wherein the line is a hydrocarbon fluid carrying line.

16. A method as claimed in claim 11, wherein the line is a hydrocarbon fluid carrying line.

17. Material as claimed in claim 5, characterized in that the texturing polymer referred to as the ionomer contains anionic groups, cationic groups and/or zwitterionic groups.

18. The method according to claim 12, characterized in that the material is interposed between the line and the outer protective sheath by pumping or pouring the material while the material is fluidified.

19. The method according to claim 15, characterized in that the material is interposed between the line and the outer protective sheath by pumping or pouring the material while the material is fluidified.

20. The method according to claim 13, characterized in that the material is injected by pumping or pouring.

21. The method according to claim 14, characterized in that the material is injected by pumping or pouring.

22. The method according to claim 13, characterized in that the material is injected by pumping.

23. The method according to claim 14, characterized in that the material is injected by pumping.

* * * * *